US008305889B2

(12) United States Patent
Watts (10) Patent No.: US 8,305,889 B2
(45) Date of Patent: Nov. 6, 2012

(54) METHOD FOR ALLOCATING A RESOURCE AMONG CONSUMERS IN PROPORTION TO CONFIGURABLE WEIGHTS

(75) Inventor: Jonathan M. Watts, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 12/697,267

(22) Filed: Jan. 31, 2010

(65) Prior Publication Data

US 2011/0188507 A1 Aug. 4, 2011

(51) Int. Cl.
*H04L 1/00* (2006.01)

(52) U.S. Cl. .......................................... 370/229; 709/226

(58) Field of Classification Search .................. 370/229, 370/235, 235.1, 230.01, 395.41, 394, 395.4, 370/412, 465; 709/226
See application file for complete search history.

(56) References Cited

U.S. PATENT DOCUMENTS

| | | | |
|---|---|---|---|
| 6,108,306 A | | 8/2000 | Kalkunte et al. |
| 6,862,265 B1 * | | 3/2005 | Appala et al. .................. 370/235 |
| 6,980,511 B1 | | 12/2005 | Li et al. |
| 8,073,951 B1 * | | 12/2011 | Young .......................... 709/226 |
| 8,089,985 B2 * | | 1/2012 | Kenney ........................ 370/468 |
| 2004/0004971 A1 * | | 1/2004 | Wang ............................ 370/412 |
| 2004/0054857 A1 * | | 3/2004 | Nowshadi ..................... 711/153 |
| 2004/0131063 A1 * | | 7/2004 | Yamamoto et al. ......... 370/395.7 |
| 2006/0004997 A1 * | | 1/2006 | Mykland ....................... 712/244 |
| 2006/0280119 A1 * | | 12/2006 | Karamanolis et al. ........ 370/229 |
| 2008/0008095 A1 * | | 1/2008 | Gilfix .............................. 370/235 |
| 2010/0098003 A1 * | | 4/2010 | Randall et al. ................ 370/329 |
| 2010/0146512 A1 * | | 6/2010 | Chen et al. .................... 718/103 |
| 2010/0286952 A1 * | | 11/2010 | Mukherjee et al. ............ 702/179 |

* cited by examiner

*Primary Examiner* — Hassan Phillips
*Assistant Examiner* — Ajay Cattungal (57) ABSTRACT

A method for allocating a resource among a plurality of consumers of the resource is described herein. For each consumer of the plurality of consumers, a configurable weight associated with the consumer is determined. For each consumer of the plurality of consumers, credits assigned to the consumer at a first interval of a plurality of variable intervals are determined. The credits may be assigned in proportion to the configurable weight associated with the consumer. A consumer is selected for servicing based on the credits of the consumer. The selected consumer is serviced.

20 Claims, 7 Drawing Sheets

METHOD FOR ALLOCATING A RESOURCE AMONG CONSUMERS IN PROPORTION TO CONFIGURABLE WEIGHTS

I. BACKGROUND

Management techniques of finite resources, such as communications links, often involve sharing the resource among a number of consumers. Consumers may include various devices, classes of traffic, flows, persons, or any other criteria that distinguishes among uses of the shared resource. When resources are shared, decisions are made as to which consumer will be permitted to use the resource when more than one consumer requires its use.

Known policies for distributing access to the shared resource include round robin scheduling algorithms and priority arbiters. In some instances, it is desirable to share the resource in a disproportionate manner such that all consumers of the resource receive a share of the available capacity but a subset of those consumers receive larger or smaller shares than the others. In the context of communication links, an amount of bandwidth can be allocated to particular consumers and groups of consumers according to their Quality-of-Service (QoS) subscription levels or priorities. Bandwidth allocation allows a port on a network device to guarantee a certain rate of throughput to an end device via a communication link.

Some methodologies for disproportionate sharing of resources use a system of credits in which each consumer is periodically allocated a number of credits proportionate to the consumer's share. The credits are decremented each time the consumer uses the resource. In the case of bandwidth allocation of the communications link, credits of the consumer are decremented when a packet of the consumer is transmitted. The shares of each consumer, however, are often times fixed and cannot be modified.

Other implementations permit the shares to be changed, but the cost to implement is high. Credits are typically reapportioned among active consumers of the resource, leaving out inactive consumers. Typical methodologies require the credits granted to each active consumer during reapportionment to be normalized to retain the desired ratios among active consumers when not all consumers are active. Normalization generally involves dividing the allocation of credits of each active consumer by the sum of the allocations for all active consumers. Arbitration is then performed based on the number of credits for each consumer. In the context of network devices, such as switches, such a division operation is prohibitively expensive to implement in hardware and may cause computational delays which dampens performance when high speed operation is desired.

Weighted round robin (WRR) is an integer-based scheduling algorithm that can be used to implement disproportionate sharing of the resource. WRR uses the weight assigned to a consumer to make the scheduling decision. The bandwidth allocated to a consumer is proportional to the weight of that consumer and inversely proportional to the total weight of all active consumers. In some instances, lower priority consumers are deprived from obtaining the requested bandwidth in the network connection, for example where a higher priority consumer having a large-sized packet occupies all available bandwidth.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION

A method for allocating a resource among a plurality of consumers of the resource is described herein. For each consumer of the plurality of consumers, a configurable weight associated with the consumer is determined. For each consumer of the plurality of consumers, credits assigned to the consumer at a first interval of a plurality of variable intervals are determined. The credits may be assigned in proportion to the configurable weight associated with the consumer. A consumer is selected for servicing based on the credits of the consumer. The selected consumer is serviced.

Network devices and scheduling methodologies associated therewith may be used to manage equitable distribution of a shared resource, such as a communications link, among consumers of the resource. Each port of a network device has a maximum bandwidth or rate (in bytes/sec or packets/sec) at which it may forward packets. Network systems may designate packets to a flow of a set of flows, buffers, queues, etc. Packets may be associated with a particular flow according to specified criteria. In one embodiment, the specified criteria may be Quality-of-service (QoS) requirements, including device and application port priorities requirements, Class-of-Service (CoS) requirements, and other criteria. In one embodiment, each flow (i.e., buffer, queue, etc.) is associated with a consumer. In other embodiments, multiple flows may be associated with a single consumer.

A portion of the bandwidth of the port may be allocated to a flow for forwarding or transmitting packets of the flow. The bandwidth allocation allows the port to guarantee a certain rate of throughput of the packets of the flow. Additionally, the port may allocate, in proportion to each flow's share, the bandwidth which is unused by an inactive consumer. As such, the various flows may be supported on the same communications link of the port by allocating a guaranteed share of bandwidth to each flow and allowing flows with offered loads to fully utilize bandwidth of another flow which does not require its full share of bandwidth.

Resource allocation may be made in proportion to a consumer's share, i.e., a configurable weight associated with each consumer. In one embodiment, the configurable weight may be modified at one or more points during the lifetime of the connection.

A. Resource Allocation

Figure 1:
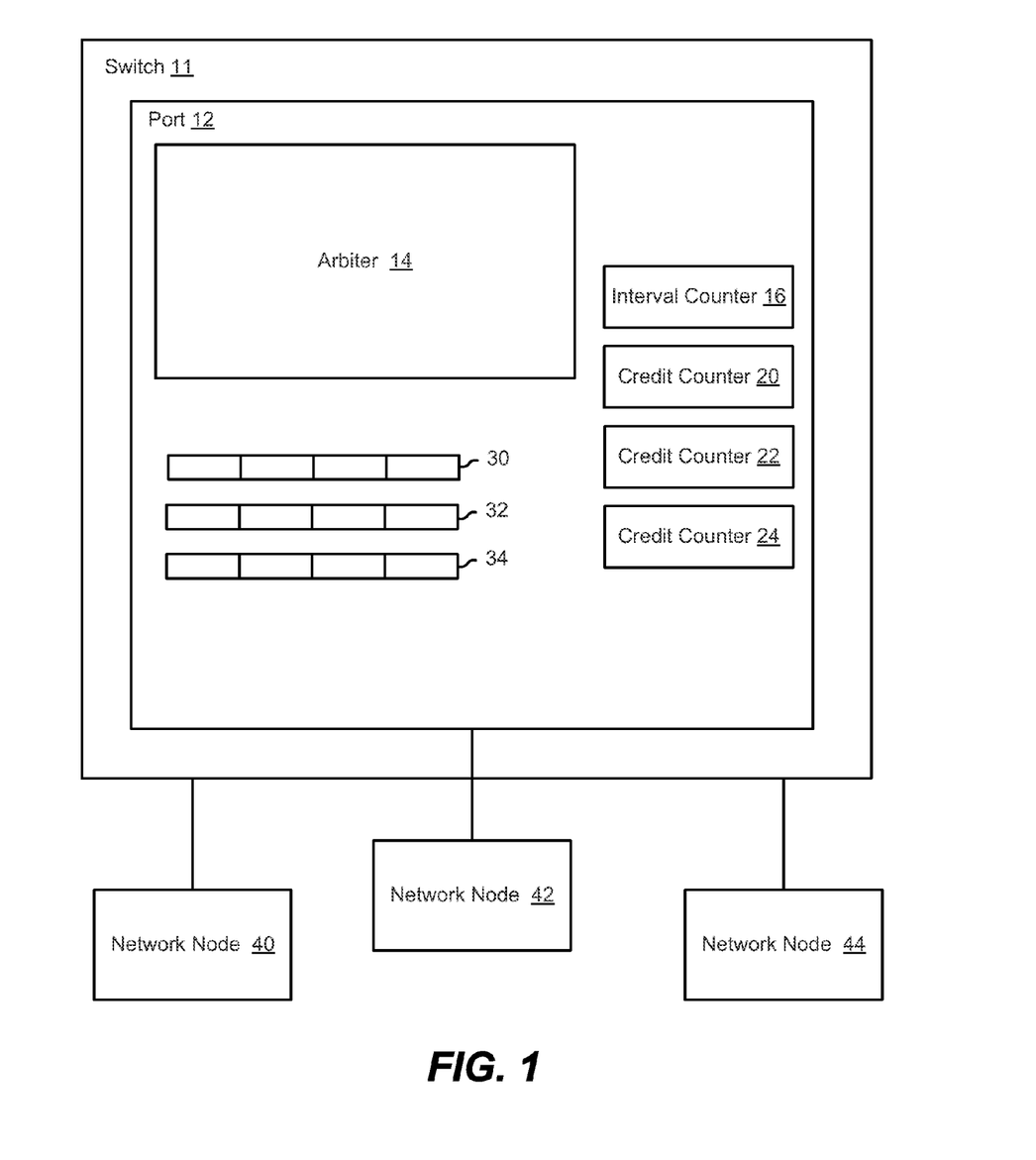
FIG. 1 is high-level block diagram of a communication network in accordance with an embodiment of the invention.

FIG. 1 is high-level block diagram of a communication network 10 in accordance with an embodiment of the invention. Network 10 includes a switch 11, network node 40, network node 42, and network node 44. Switch 11 is operatively coupled to network nodes 40-44. A network node is a network station, a router, another network switch, or other network device. In other embodiments, network 10 may be implemented in various arrangements.

Switch 11 is configured to analyze and filter packets. Switch 11 is further configured to control transmission of data packets. In another embodiment, switch 11 may be configured to allocate a shared resource, such as bandwidth of a port of switch 11, among consumers of the bandwidth.

Switch 11 may have a plurality of network switch ports for communication with network nodes. As shown, switch 11 includes port 12 for communication with network node 42. Port 12 is configured to transmit data packets in FIFOs 30-34. In one embodiment, port 12 and network node 42 may transmit data packets via a corresponding communication link, such as a point-to-point, full duplex IEEE 802.3x link.

Port 12 includes an arbiter 14 and outbound First In/First Out (FIFO) buffers 30-34. Arbiter 14 is configured to make traffic selection decisions on packets when available bandwidth for a network connection is insufficient to service all bandwidth requests. As such, arbiter 14 may select a packet from one of outbound FIFOs 30-34 to send out via port 12 to network node 42. In one embodiment, the other network switch ports of switch 11 may also include their own arbiter and outbound FIFOs for controlling the transmission of network traffic out of the port and via the corresponding communication link. Arbiter 14 may be configured to make traffic selection decisions for traffic of one or more ports of switch 11.

As packets are forwarded to a port through which the packets are to be sent (i.e., output port), the packets are received by one or more outbound FIFOs associated with the output port. For example, outbound FIFOs 30-34 are associated with port 12. Switch 11 may designate the network traffic into one of outbound FIFOs 30-34 according to priority, level of service, or other specified criteria. Any number of FIFOs, queues or other structures may be used to segregate the network traffic. In one embodiment, a switch controller, coupled to one or more ports of switch 11, is configured to designate a data packet to a buffer of a plurality of buffers associated with port 12. Outbound FIFO 30 may be a high priority buffer holding packets which are associated with a high priority status. outbound FIFOs 32 and 34 may be a medium priority buffer and a low priority buffer associated with a medium and low priority status, respectively. Each of outbound FIFOs 30, 32, and 34 may be regarded as consumers of a network connection. Traffic selection may be performed where packets are picked from one or more outbound FIFOs 32-34 for transmission out of port 12.

Arbiter 14 may make the traffic selection decisions for the prioritized traffic using a credit-based allocation scheme. For each outbound FIFO 30-34, an associated configurable weight is determined, and the credits assigned to each of FIFOs 30-34 are determined.

Each credit represents a quantity of data. Credits are tracked to ensure that consumers do not exceed their allocated share of the bandwidth. Credits are assigned on a per-consumer basis. Specifically, credits are assigned in proportion to the configurable weight associated with a FIFO. Moreover, credits are distributed on an interval-by-interval basis. In one embodiment, the intervals are variable, such that, for example, a duration of a first interval varies from a duration of a second interval.

The credit-based approach provides enhanced fairness to ensure that greedy consumers are regulated. To track the credit consumption by a consumer, a credit counter may be used. For example, each of credit counters 20-24 may track the credit consumption by a consumer. Additionally, the consumption of the credits during one or more intervals is tracked using interval counter 16. In other words, interval counter 16 tracks the consumption of credits by port 12.

Arbiter 14 may distribute credits on an interval-by-interval basis. The system is initialized with a quantity of credits distributed among the consumers. During operation, credits are neither lost nor created. Whenever credits are granted to a consumer they are also added to the interval counter. Likewise, when a consumer is serviced, credits are decremented from the credit counter associated with the consumer as well as the interval counter. As such, the difference between the sum of all consumer credits and the interval counter is a constant value.

In conjunction with the credit counters, the interval counter ensures conservation of credits throughout the system. Where credits are consumed in a non-unitary quantity, for example when packets of variable sizes are serviced, interval counter 16 may be allowed to go negative. In one embodiment, if a consumer's credits have gone to zero, neither the consumer nor the interval counter is decremented if the consumer is serviced. For example, an active consumer whose credits have all been consumed may be permitted for some time to consume bandwidth where other consumers are otherwise inactive so as not to waste the available bandwidth. During such time, the credits consumed by the bandwidth utilization may not be tracked by the credit counter of the active consumer or the interval counter.

Arbiter 14 allocates bandwidth to the FIFOs 30-34 based on the assigned credits. In addition, arbiter 14 makes traffic selection decisions based on the resource allocation that was determined when the network connection was initially set up. Traffic selection decisions may also be based on modified resource allocations. The resource allocation may be modified at one or more points during the lifetime of the connection. Modification may include adjusting a configurable weight associated with a consumer.

Network 10 is an example of a network that can incorporate the resource allocation and traffic selection scheme disclosed herein. In one embodiment, network 10 is a wired network, however, the resource allocation and traffic selection scheme is not limited to use with wired communication networks. For example, network 10 may be a wireless communication network or a communication network which includes a combination of wired and wireless technology.

Figure 2:
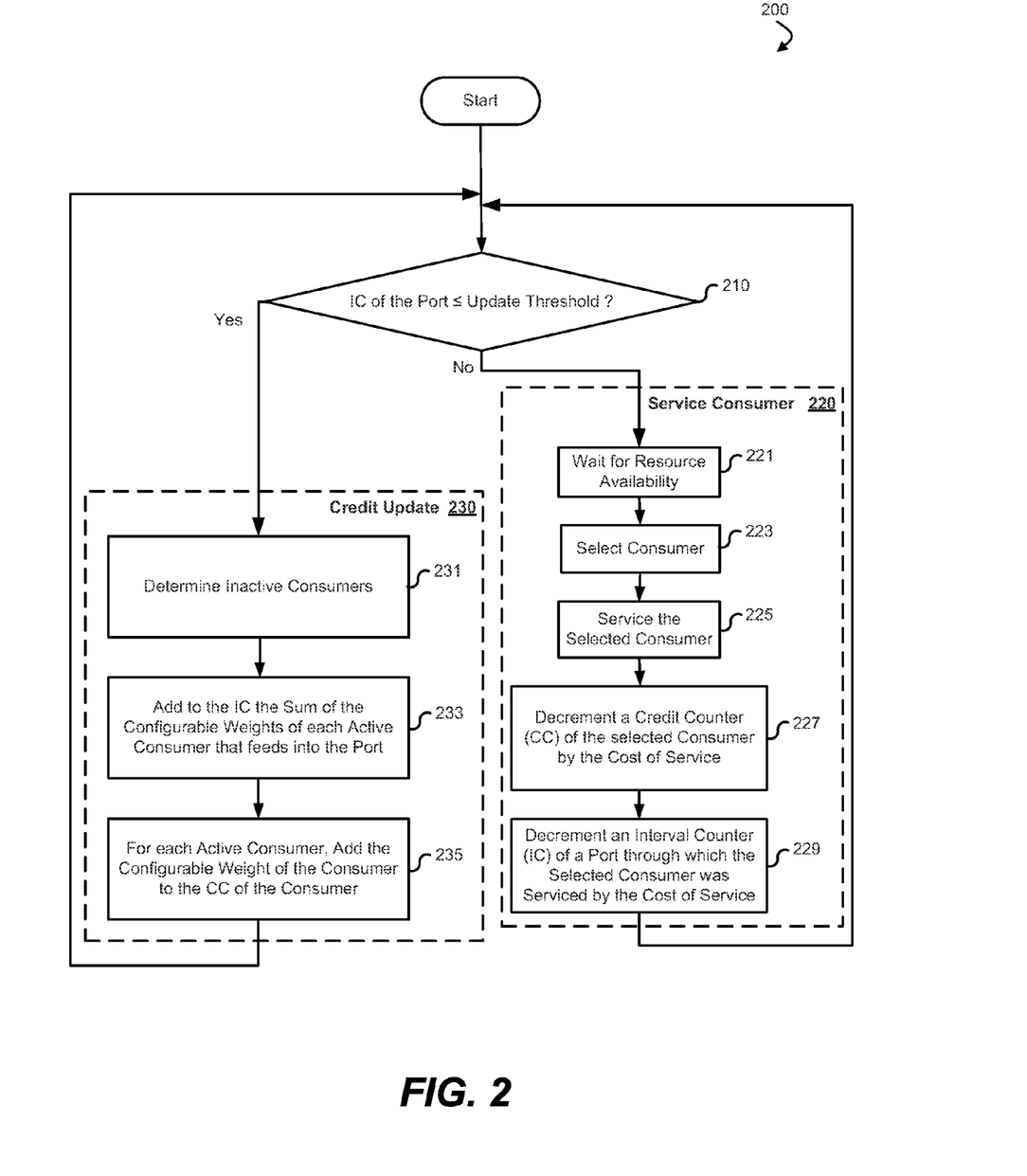
FIG. 2 is a process flow diagram depicting allocation of credits for use of a shared resource in accordance with an embodiment of the invention.

FIG. 2 is a process flow diagram 200 depicting allocation of credits for use of a shared resource in accordance with an embodiment of the invention. The depicted process flow may be carried out by execution of one or more sequences of executable instructions. In another embodiment, the process flow is carried out by components of a network device, such as a port, an arrangement of hardware logic, e.g., an Application-Specific Integrated Circuit (ASIC), etc.

Packets may be received by a network device, such as a switch, and stored. For each received packet, switching decisions are made. For example, at least one output port of the network device is identified for transmitting the packet. The packets may be assigned a priority, grouped or otherwise designated into flows according to various criteria and user-defined policies. As previously described, the specified criteria may be Quality-of-service (QoS) requirements, including device and application port priorities requirements, class of service (CoS) requirements, etc. For example, packets may be assigned a priority based on a CoS value and designated to one of a plurality of FIFOs, where each FIFO represents a level of service.

The system is initialized with a quantity of credits distributed among the consumers (e.g., FIFOs) according to a configurable weight of each consumer. In one embodiment, each consumer is associated with a configurable weight, which is expressed in arbitrary units. The credits are allocated to each consumer based on its configurable weight.

The credits of each consumer are maintained by a credit counter. An interval counter tracks the total number of credits allocated to the consumers on an interval-by-interval basis and the usage of those credits. The interval counter may be initialized to zero and the credit counters may be initialized to a constant value. In other embodiments, the interval counter and credit counters may be initialized to other values.

Upon completion of initialization, at step 210, it is determined whether the interval counter associated with the port is equal to or below an update threshold. The update threshold ensures that the interval counter is at least positive before selecting a consumer to service. In one embodiment, the update threshold is any value used to mark the end of an interval or the beginning of another interval. In one embodiment, the update threshold is a value of zero.

If the interval counter is not equal to or below the update threshold, processing continues to step 220 where consumers are serviced. Otherwise, the interval counter has expired and a credit update step 230 is performed, marking the end of one interval and/or the beginning of another interval.

Service Consumer

Consumers may be serviced at step 220. The system waits for the resource to be available to transmit packets at step 221. A consumer is selected for servicing at step 223. Various known techniques for performing the selection may be implemented. For example, the consumer (e.g., FIFO) having the greatest number of credits may be selected. In another embodiment, service is awarded to the consumer in a round-robin manner for all consumers with credits above a minimum threshold. Selection may be based on other criteria or combination of thereof.

Once selected, at step 225, the selected consumer is serviced. In one embodiment, servicing the consumer may include picking a packet from the selected FIFO and transmitting the packet out of the port via the communication link.

A number of credits may be deducted from a credit counter and an interval counter. At step 227, the credit counter of the selected consumer is decremented by the cost of the service. As previously described, each credit may represent a quantity of data. The cost of service may be, for example, the amount of time it takes to provide the service. A scalar may be incorporated depending on the unit in which cost of service is measured. Packets may vary in size. The transmission of larger packets consumes more bandwidth than packets of smaller size. To account for the difference in packet size, each time a consumer is given service, its credits are decremented by the cost of service. In another embodiment, the cost of consuming the resource may be a fixed amount. The interval counter may be decremented by the fixed amount each time a unit of work is performed.

The interval counter associated with the port through which the selected consumer was serviced is decremented by the cost of the service, at step 229. Each time a consumer is given service, the interval counter is decremented by the same number of credits as the credit counter of the selected consumer. Processing loops back to step 210 where the value of the interval counter is checked. It should be appreciated that in alternate embodiments, steps 227 and 229 may be performed in any order, in serial or in parallel.

Credit Update

Upon determining that the interval counter is equal to or below the update threshold at step 210, processing continues to step 230 where a credit update is performed.

At step 231, inactive consumers are determined. A consumer having credits exceeding a ceiling or maximum threshold may be identified as an inactive consumer. A credit count above the maximum threshold indicates that the consumer has not consumed much of the resource, and as such, may be considered inactive. The maximum threshold may be a default value, a dynamically determined value, etc. The maximum threshold may be configurable. Alternatively, other methods may be implemented to identify inactive consumers, such as whether the consumer has an offered load.

Credits are added to the interval counter. At step 233, the sum of the configurable weights of the active consumers that feed into the port is added to the interval counter. The configurable weights of the inactive consumers may be excluded from being represented in the interval counter for the interval. Since the number of credits being added to the interval counter can vary according to the number of active consumers for the interval, each interval itself can vary. The variance in the intervals enables the configurable weights to be modified at any time other than during a credit update process. Moreover, the variable intervals allow the credits of the inactive consumers to be redistributed to the active consumers without having to perform multiply and divide operations, which are expensive to implement in hardware.

At step 235, for each active consumer, the configurable weight of the consumer is added to the credit counter (CC) of the consumer. Thus, credits are added to a count of the active consumer's respective credit counter. As such, the resource (e.g., bandwidth) that is not used by an inactive consumer is allocated to the active consumers in proportion to their respective configurable weights. Processing loops back to step 210 where the value of the interval counter is checked. The credit update step 230 may be repeated until the interval counter is greater than the update threshold. It should be appreciated that in alternate embodiments, steps 233 and 235 may be performed in any order, in serial or in parallel.

Figure 3A:
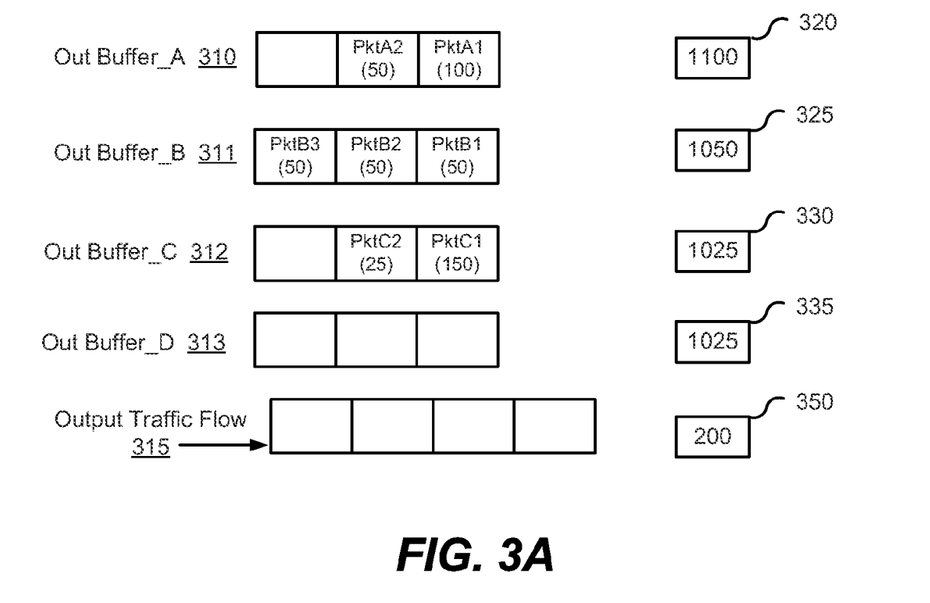
FIG. 3A is a simplified high-level block diagram of outbound buffers and counters for credit allocation in accordance with an embodiment of the invention.

FIG. 3A is a simplified high-level block diagram of outbound buffers and counters for credit allocation in accordance with an embodiment of the invention. Outbound buffer 310 (Out Buffer_A), outbound buffer 311 (Out Buffer_B), outbound buffer 312 (Out Buffer_C), outbound buffer 313 (Out Buffer_D), output traffic flow 315, credit counters 320-335, and interval counter 350 may be associated with, for example, an output port of a switch. Credit counter 320 maintains the credit count for outbound buffer 310. Credit counter 325 maintains the credit count for outbound buffer 311. Credit counter 330 maintains the credit count for outbound buffer 312. Credit counter 335 maintains the credit count for outbound buffer 313. Interval counter 350 tracks the consumption of bandwidth associated with the output port (measured in credits) during an interval.

Outbound buffer 310 may be a high priority buffer holding packets which are associated with a high priority status. Outbound buffers 311 and 312 may be a medium-high priority buffer and a medium-low priority buffer associated with a medium-high and medium-low priority status, respectively. Outbound buffer 313 may be a low priority buffer holding packets which are associated with a low priority status.

Outbound buffers 310-313 may hold packets of variable sizes. As shown, outbound buffer 310 holds two packets: one packet of 100 bytes, and another packet of 50 bytes. Outbound buffer 311 holds three packets all of which are 50 bytes in size. Outbound buffer 312 holds two packets: one packet of 150 bytes, and another packet of 25 bytes. Outbound buffer 313 does not have an offered load and is shown as an empty buffer.

Each of outbound buffers 310-313 may be regarded as consumers of a network connection via the outbound port. Each consumer is associated with a configurable weight. For purposes of explanation, an exemplary weighting scheme is included:

| Buffer Identifier | Configurable Weight |
| --- | --- |
| Out Buffer 310 | 100 |
| Out Buffer 311 | 50 |
| Out Buffer 312 | 25 |
| Out Buffer 313 | 25 |

After initialization, as shown, credit counter 320 has 1100 credits. Credit counter 325 has 1050 credits. Credit counter 330 has 1025 credits, and credit counter 335 has 1025 credits. Credit counters 320-335 have an offset of 1000 credits. Interval counter 350 has the same number of credits as allocated to each of the consumers. In this exemplary embodiment, interval counter 350 has 200 credits. Output traffic flow 315 is empty.

Figure 3B:
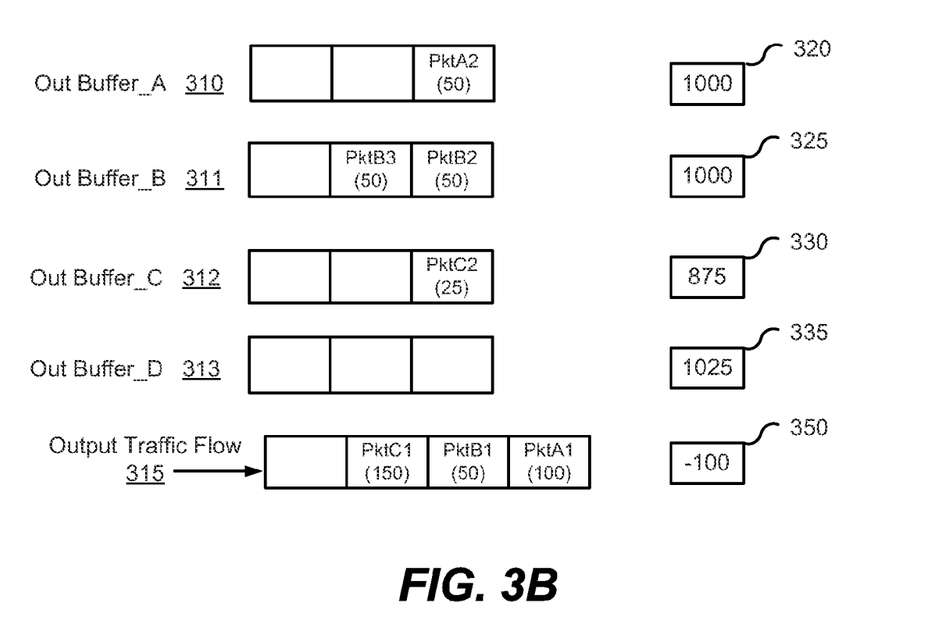
FIG. 3B is another simplified high-level block diagram of outbound buffers and counters for credit allocation in accordance with an embodiment of the invention.

FIG. 3B is another simplified high-level block diagram of outbound buffers and counters for credit allocation in accordance with an embodiment of the invention. In one embodiment, FIG. 3B depicts the buffers and counters of FIG. 3A after three packets have been transmitted according to the resource allocation and traffic selection policies as described herein.

In the exemplary embodiment, since interval counter 350 has a value greater than an update threshold (where the update threshold is zero), the system may service a consumer. A consumer may be selected for servicing after the resource is available. As shown, outbound buffer 310 is selected for servicing. A packet from the selected outbound buffer 310 is transmitted via an output port of a switch as reflected in output traffic flow 315. In one embodiment, the packet at the head of the selected buffer is transmitted. Alternatively, other methods of choosing a packet from the selected consumer may be implemented. Credit counter 320 is decremented by the cost of the service. Where each credit represents 1 byte of data, the cost to service the packet from outbound buffer 310 is 100 credits. Interval counter 350 is also decremented by the cost of the service to a value of 100 credits (i.e., 200 credits minus 100 credits).

Since interval counter 350 has a value greater than the update threshold, a consumer is again selected for servicing after the resource is available. Outbound buffer 311 is selected for servicing. A packet from the head of outbound buffer 311 is transmitted and thus reflected in output traffic flow 315. Credit counter 325 is decremented by the cost of the service, which is 50 credits. Interval counter 350 is also decremented by the cost of the service to a value of 50 credits (i.e., 100 credits minus 50 credits).

Again, interval counter 350 has a value greater than the update threshold, and as such a consumer is selected for servicing after the resource is available. Outbound buffer 312 is selected for servicing. A packet from the head of outbound buffer 312 is transmitted and thus reflected in output traffic flow 315. Credit counter 330 is decremented by the cost of the service, which is 150 credits. Interval counter 350 is also decremented by the cost of the service to a value of negative 100 credits (i.e., 50 credits minus 150 credits).

Figure 3C:
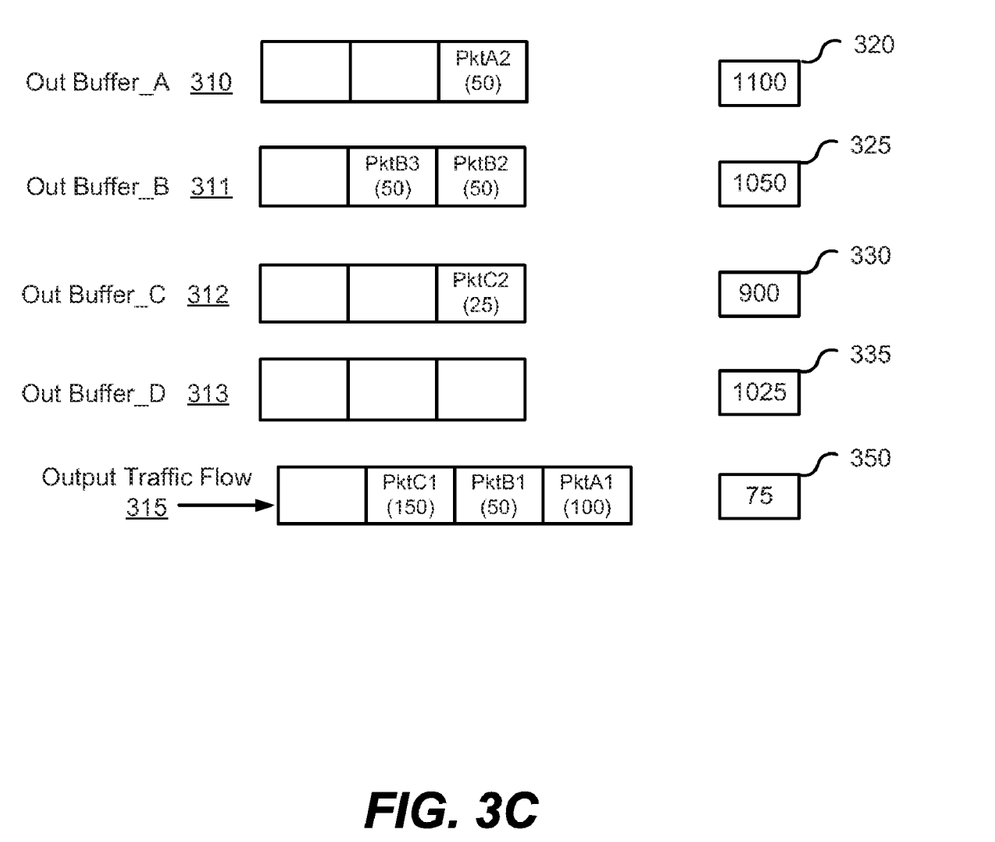
FIG. 3C is yet another simplified high-level block diagram of outbound buffers and counters for credit allocation in accordance with an embodiment of the invention.

FIG. 3C is yet another simplified high-level block diagram of outbound buffers and counters for credit allocation in accordance with an embodiment of the invention. In one embodiment, FIG. 3C depicts the buffers and counters of FIG. 3B after a credit update process.

In the exemplary embodiment continuing from FIG. 3B, interval counter 350 has a value (i.e., negative 100) less than the update threshold (i.e., zero), marking the beginning of a new interval. When interval counter 350 is less than or equal to the update threshold, credits are awarded in a credit update process as previously described. The inactive consumers are determined. As shown, outbound buffer 313 does not have an offered load and may thus be considered inactive.

Credits are allocated to the active consumers. For each active consumer, the configurable weight of the consumer is added to the corresponding credit counter of consumer. Outbound buffer 310, outbound buffer 311, and outbound buffer 312 are all active consumers. Credit counter 320, which is associated with outbound buffer 310, is allocated 100 credits bringing the credit count to 1100. Credit counter 325, which is associated with outbound buffer 311, is allocated 50 credits bringing the credit count to 1050. Credit counter 330, which is associated with outbound buffer 312, is allocated 25 credits bringing the credit count to 900. Credits are not allocated to outbound buffer 313, which was determined to be an inactive consumer, and as such, the credit count remains at 1025 for credit counter 335.

To maintain the conservation of credits, credits are also allocated to interval counter 350. The sum of the configurable weights of the active consumers that feed into the port is added to the interval counter (i.e., −100+175 credits). As shown, interval counter 350 holds a value of 75 credits. Once the interval counter has a value above the update threshold, the credit update process may conclude and consumers may again be selected for servicing.

B. Normalization

There are instances in which normalization may be performed, for example to reduce the number of iterations through an update process.

Figure 4:
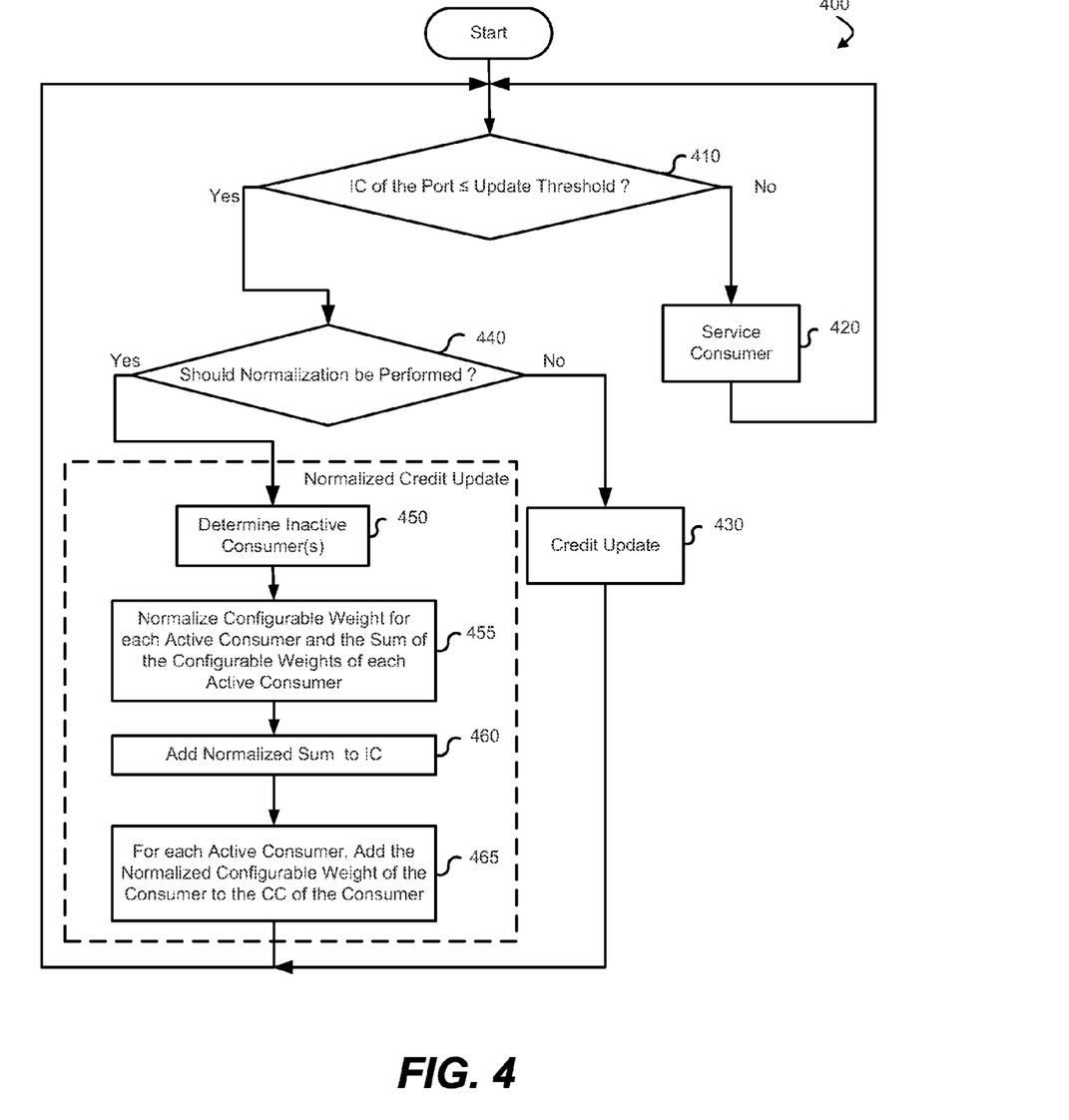
FIG. 4 is a process flow diagram depicting allocation of credits for use of a shared resource in accordance with an embodiment of the invention.

FIG. 4 is a process flow 400 diagram depicting allocation of credits for use of a shared resource in accordance with an embodiment of the invention. The depicted process flow 400 may be carried out by execution of one or more sequences of executable instructions. In another embodiment, the process flow is carried out by components of a network device, such as a port, an arrangement of hardware logic, e.g., an Application-Specific Integrated Circuit (ASIC), etc.

Upon initialization, at step 410, it is determined whether the interval counter associated with the port is equal to or below an update threshold. If the interval counter is greater than the update threshold, the counters are not updated with credits and processing continues to step 420 where consumers may be serviced. In one embodiment, step 420 is functionally similar to step 220 of FIG. 2.

Otherwise, it is detected that the interval counter is equal to or below the update threshold, and as such, the interval counter has expired. Before performing a credit update, it is determined whether normalization is to be performed.

Granting service to a consumer may cause the interval counter to become negative by an excessive amount, for example, by servicing a packet of a large size. Under these and other conditions, multiple iterations through a credit update process may be needed before the interval counter exceeds the update threshold and can service another consumer. However, multiple iterations may occupy many clock cycles to resolve. In one embodiment, the iterations may be implemented under a single clock cycle, however, a significant amount of hardware may be needed for such an implementation. Normalization may be performed to reduce the number of iterations through a credit update process.

A decision is made as to whether or not normalization is to be performed at step 440. One embodiment of the normalization decision is further described with regard to FIG. 5A. If it is determined that normalization should be bypassed, processing continues to step 430 where a credit update is performed. In one embodiment, step 430 is functionally similar to step 230 of FIG. 2. Processing may then loop back to step 410 where the value of the interval counter is examined.

If it is determined that normalization should be performed, at step 450, inactive consumers are determined. The configurable weights for each active consumer are normalized at step 455. Additionally, the sum of the configurable weights of each active consumer is also normalized. One embodiment of normalization is further described with regard to FIG. 5B. At step 460, the normalized sum of the configurable weights is added to the interval counter. In one embodiment, an updated count of the interval counter is determined based on the normalized sum.

At step 465, for each active consumer, the normalized configurable weight of the consumer is added to the credit counter (CC) of the consumer. In one embodiment, for each of the active consumers, an updated count of the credit counter is determined based on the normalized configurable weight of the consumer. Processing loops back to step 410 where the value of the interval counter is checked. The credit update may be repeated until the interval counter is greater than the update threshold.

Figure 5A:
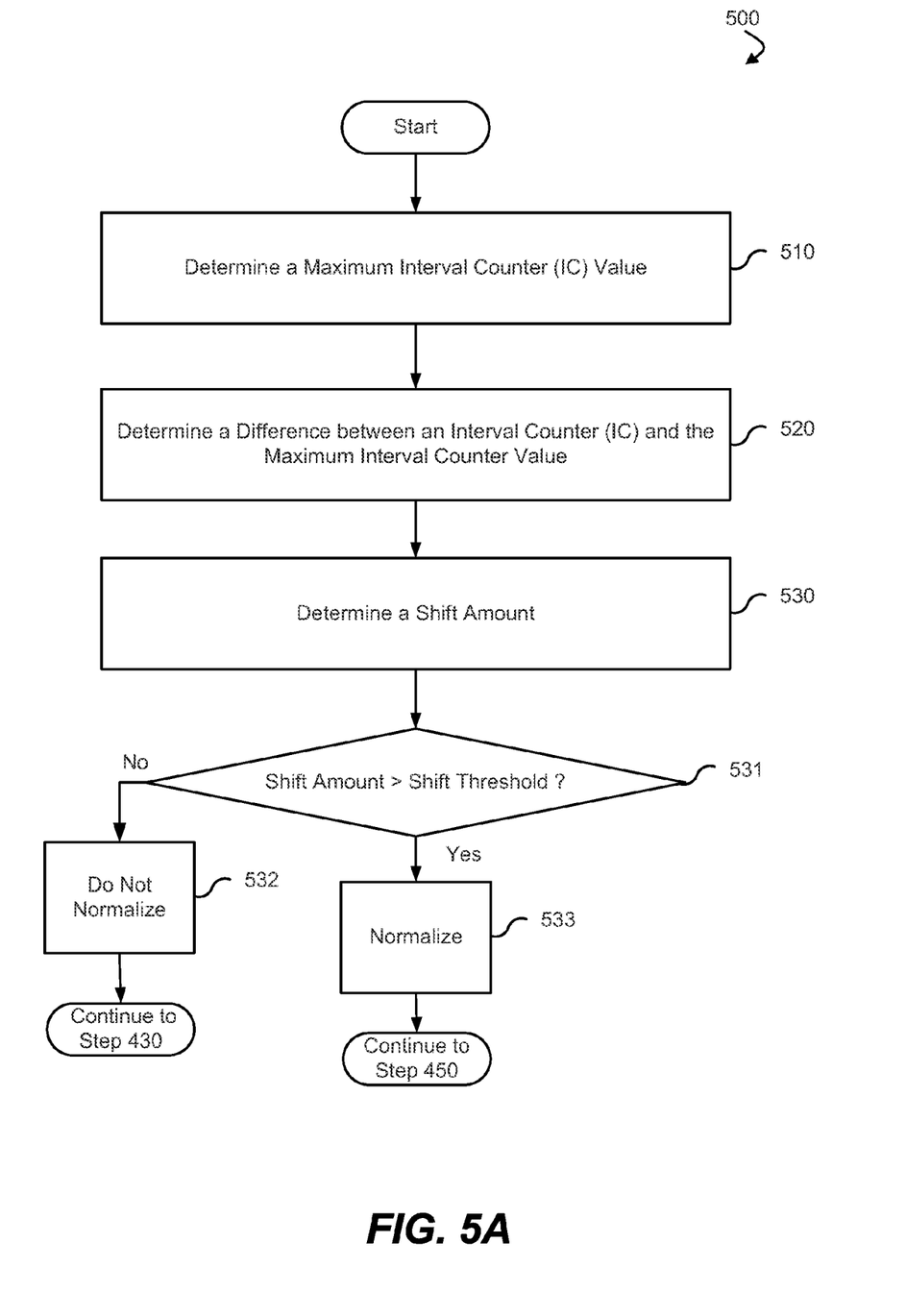
FIG. 5A is a process flow diagram depicting determination of a shift amount in accordance with an embodiment of the invention.

FIG. 5A is a process flow 500 diagram depicting determination of a shift amount in accordance with an embodiment of the invention. The depicted process flow 500 may be carried out by execution of one or more sequences of executable instructions. In another embodiment, the process flow is carried out by components of a network device, such as a port, an arrangement of hardware logic, e.g., an Application-Specific Integrated Circuit (ASIC), etc.

A decision is made as to whether normalization should be performed. At step 510, a maximum value that the interval counter is allowed (i.e., maximum interval counter) is determined. The maximum interval counter (IC) may be used to determine bit positions for normalized weight values. The maximum IC may be determined based one or more factors. For example, the number of bytes that are dedicated to the interval counter, the maximum frequency with which credit counters can be updated, and/or the effect on burstiness of the consumer flows may be considered.

At step 520, a difference between the interval counter and the maximum IC is determined. At step 530, a shift amount indicating how much to shift the weight values is determined. The shift amount is used for bit-shifting which is an efficient implementation in digital logic and will result in the interval variation being less than a factor of 2. The shift amount is determined using the difference between the interval counter and the maximum IC. The bit position of the most significant zero of the difference is determined. In an alternative embodiment, a complement of the difference may be determined and the bit position of the most significant "1" value is determined. In one embodiment, the bit position of the most significant bit of the sum of the configurable weights of all active consumers is also determined. A difference between these bit positions provides the shift amount.

At step 531, it is determined whether the shift amount is greater than a shift threshold. The shift threshold may be an integer, such as zero. Where the shift amount is greater than the shift threshold, at step 533, a decision is made that normalization should be performed and processing continues to step 450 of FIG. 4. Otherwise, at step 532, a decision is made that normalization should not be performed and processing continues to step 430 of FIG. 4.

In one embodiment, normalization may be performed regardless of the shift amount. As such, step 531 may be omitted and normalization at step 533 may follow step 530.

Figure 5B:
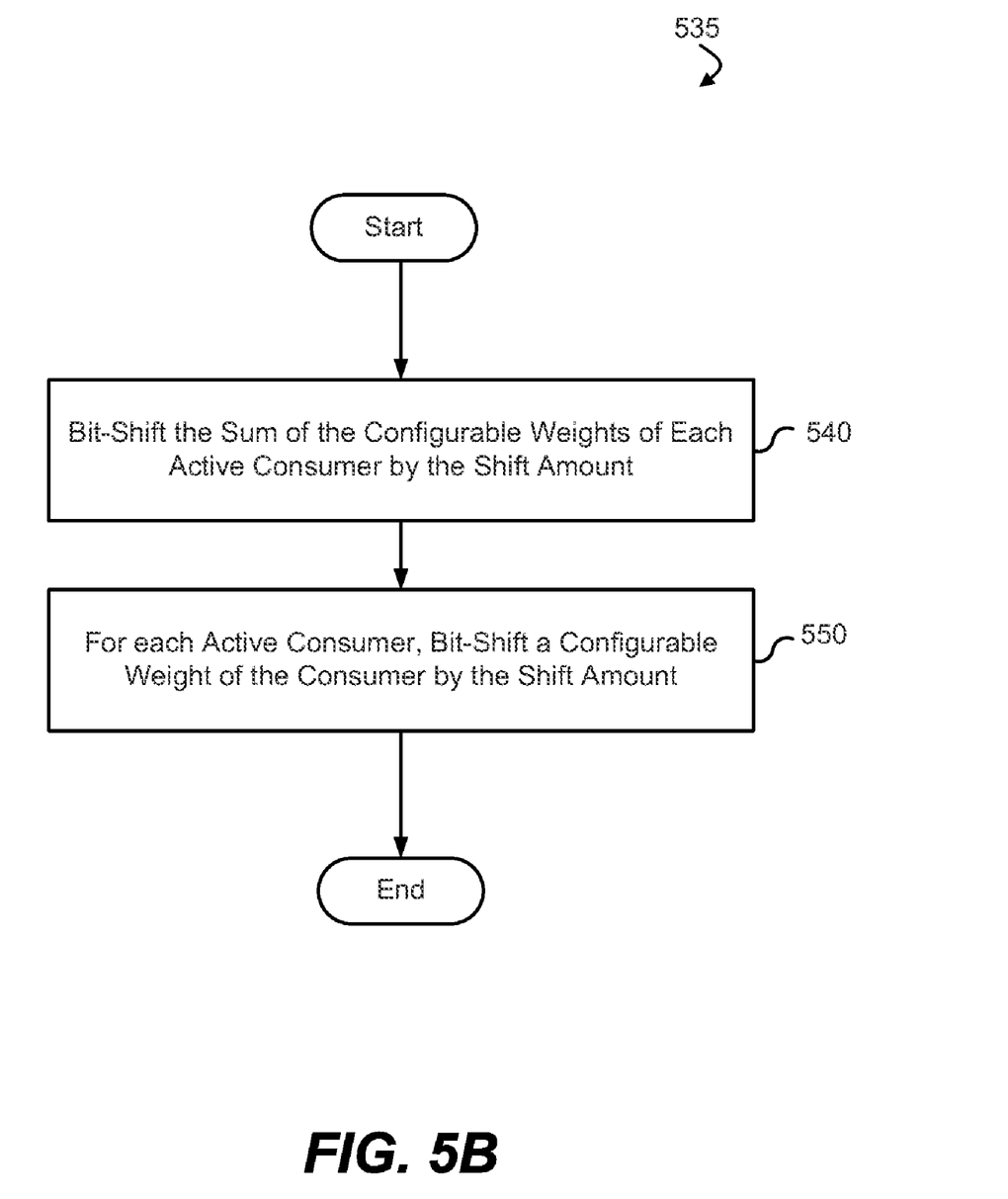
FIG. 5B is a process flow diagram depicting normalization of configurable weights in accordance with an embodiment of the invention.

FIG. 5B is a process flow 535 diagram depicting normalization of configurable weights in accordance with an embodiment of the invention. The depicted process flow 535 is carried out by execution of one or more sequences of executable instructions. In another embodiment, the process flow is carried out by components of a network device, such as a port, an arrangement of hardware logic, e.g., an Application-Specific Integrated Circuit (ASIC), etc.

In one embodiment, configurable weight values may be represented in binary, such as base-2 notation. Normalization may be performed by bit-shifting the binary representations of the configurable weights and the sum of the configurable weights.

A set of active consumers (e.g., FIFO, queue, buffers, etc.) are determined. At step 540, the sum of the configurable weights of all active consumers in the set is bit-shifted by a shift amount, for example, as determined at step 530 in FIG. 5A. In one embodiment, a binary value of the sum is left-shifted by the shift amount, producing a normalized sum of the configurable weights of all active consumers. Additionally, for each active consumer in the set, a corresponding configurable weight of the consumer is bit-shifted by the shift amount, at step 550. For example, a binary value of a configurable weight may be left-shifted by the shift amount, producing a normalized configurable weight. It should be appreciated that in alternate embodiments, steps 540 and 550 may be performed in any order, in serial or in parallel.

It will be appreciated that embodiments of the present invention can be realized in the form of hardware, software or a combination of hardware and software. Any such software may be stored in the form of computer-readable storage medium that are suitable for storing a plurality of instructions for controlling a data processor, the plurality of instructions, when executed, for example by the processor, implement embodiments of the present invention. Accordingly, embodiments provide a program comprising code for implementing a system or method as claimed in any preceding claim and a computer-readable storage medium storing such a program.

Storage media and computer readable media for storing a plurality of instructions, or portions of instructions, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method of allocating a resource among a plurality of consumers of the resource, the method comprising:
   for each consumer of the plurality of consumers, determining a configurable weight associated with the consumer;
   for each consumer of the plurality of consumers, determining credits assigned to the consumer at a first interval of a plurality of variable intervals, the credits assigned in proportion to the configurable weight associated with the consumer;
   selecting, by a data processor, a consumer of the plurality of consumers for servicing based on the credits of the consumer;
   servicing the selected consumer;
   detecting consumers that are active during the first interval;
   determining a sum of the configurable weights associated with the active consumers; and
   allocating the sum of the configurable weights associated with the active consumers to a second interval.

2. The method of claim 1, further comprising:
   for each consumer of the plurality of consumers, tracking the assigned credits using a credit counter;
   tracking consumption of the resource for one or more of the plurality of variable intervals using an interval counter; and
   deducting a number of credits from the credit counter of the selected consumer and the interval counter.

3. The method of claim 2, further comprising:
   detecting that the interval counter is below an update threshold.

4. The method of claim 3, further comprising:
   normalizing the configurable weight of each of the active consumers;
   normalizing the sum of the configurable weights of the active consumers;
   determining an updated count of the interval counter based on the normalized sum; and
   for each of the active consumers, determining an updated count of the credit counter of the consumer based on the normalized configurable weight of the consumer.

5. The method of claim 4, wherein the configurable weight of each of the active consumers is normalized by bit-shifting a binary representation of the configurable weight of each of the active consumers by a shift amount.

6. The method of claim 4, wherein the sum is normalized by bit-shifting a binary representation of the sum by a shift amount.

7. The method of claim 2, further comprising:
   determining the end of the first interval based on the interval counter;
   allocating the sum of the configurable weights associated with the active consumers to a count of the interval counter for the second interval; and
   for each of the active consumers, allocating the configurable weight associated with the consumer to a count of the credit counter of the consumer.

8. The method of claim 1, further comprising:
   allocating the resource credits of an inactive consumer to the active consumers in proportion to the configurable weight associated with each of the active consumers.

9. A network switch device for use in a network for controlling transmission of data packets through the network switch, the switch comprising:
   a plurality of ports; and
   a switch controller coupled to the plurality of ports, wherein the switch controller is to designate a data packet to a buffer of a plurality of buffers associated with a port of the plurality of ports,
   wherein the port is to:
      for each buffer, determine a configurable weight associated with the buffer;
      for each buffer, determine credits assigned to the buffer at a first interval of a plurality of variable intervals, the credits assigned in proportion to the configurable weight associated with the buffer;
      select a buffer of the plurality of buffers for servicing based on the credits of the buffer;
      transmit via the port a data packet from the selected buffer;
      detect buffers that are active during the first interval;
      determine a sum of the configurable weights associated with the active buffers; and
      allocate the sum of the configurable weights associated with the active buffers to a second interval.

10. The network switch device of claim 9, wherein the port is further to:
    track the assigned credits using a credit counter, for each buffer;
    track consumption of bandwidth of the port for one or more of the plurality of variable intervals using an interval counter; and
    deduct a number of credits from the credit counter of the selected buffer and the interval counter.

11. The network switch device of claim 10, wherein the port is further to:
    detect that the interval counter is below an update threshold.

12. The network switch device of claim 11, wherein the port is further to:
    normalize the configurable weight of each of the active buffers;
    normalize the sum of the configurable weights of the active buffers;
    determine an updated count of the interval counter based on the normalized sum; and
    for each of the active buffers, determine an updated count of the credit counter of the buffer based on the normalized configurable weight of the buffer.

13. The network switch device of claim 12, wherein the configurable weight of each of the active buffers is normalized by bit-shifting a binary representation of the configurable weight of each of the active buffers by a shift amount.

14. The network switch device of claim 9, wherein the designation of the data packet to the buffer is based on at least one of a Quality-of-Service requirement and a Class-of-Service requirement.

15. The network switch device of claim 9, wherein the port is further to allocate bandwidth of an inactive buffer to the active buffers in proportion to the configurable weight associated with each of the active buffers.

16. A non-transitory computer-readable medium storing a plurality of instructions for controlling a data processor for allocating a resource among a plurality of consumers of the resource, the plurality of instructions comprising instructions that cause the data processor to:
- determine, for each consumer of the plurality of consumers, a configurable weight associated with the consumer;
- determine, for each consumer of the plurality of consumers, credits assigned to the consumer at a first interval of a plurality of variable intervals, the credits assigned in proportion to the configurable weight associated with the consumer;
- select a consumer of the plurality of consumers for servicing based on the credits of the consumer;
- service the selected consumer;
- detect consumers that are active during the first interval;
- determine a sum of the configurable weights associated with the active consumers; and
- allocate the sum of the configurable weights associated with the active consumers to a second interval.

17. The non-transitory computer-readable medium of claim 16, wherein the plurality of instructions further comprise instructions that cause the data processor to:
- track, for each consumer of the plurality of consumers, the assigned credits using a credit counter;
- track consumption of the resource for one or more of the plurality of variable intervals using an interval counter; and
- deduct a number of credits from the credit counter of the selected consumer and the interval counter.

18. The non-transitory computer-readable medium of claim 17, wherein the plurality of instructions further comprise:
- instructions that cause the data processor to detect that the interval counter is below an update threshold.

19. The non-transitory computer-readable medium of claim 17, wherein the plurality of instructions further comprise instructions that cause the data processor to:
- determine the end of the first interval based on the interval counter;
- allocate the sum of the configurable weights associated with the active consumers to a count of the interval counter for the second interval; and
- allocate, for each of the active consumers, the configurable weight associated with the consumer to a count of the credit counter of the consumer.

20. The non-transitory computer-readable medium of claim 16, wherein the plurality of instructions further comprise:
- instructions that cause the data processor to allocate the credits of an inactive consumer to the active consumers in proportion to the configurable weight associated with each of the active consumers.

* * * * *

UNITED STATES PATENT AND TRADEMARK OFFICE
CERTIFICATE OF CORRECTION

PATENT NO.        : 8,305,889 B2
APPLICATION NO.   : 12/697267
DATED             : November 6, 2012
INVENTOR(S)       : Jonathan M. Watts It is certified that error appears in the above-identified patent and that said Letters Patent is hereby corrected as shown below:

In the Claims

In column 12, line 17, in Claim 8, after "allocating the" delete "resource".

Signed and Sealed this
Twenty-fourth Day of September, 2013

Teresa Stanek Rea
*Deputy Director of the United States Patent and Trademark Office*